United States Patent
Hetherington et al.

(10) Patent No.: US 6,859,456 B1
(45) Date of Patent: Feb. 22, 2005

(54) METHOD AND APPARATUS FOR CHECKING COMMUNICATED DATA

(75) Inventors: Mark D. Hetherington, Crystal Lake, IL (US); Lee M. Proctor, Cary, IL (US); Nai Sum Wong, Palatine, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/524,066

(22) Filed: Mar. 13, 2000

(51) Int. Cl.[7] .............................. H04L 12/28; H04L 1/00; H04J 3/12; H03M 13/00; H04Q 7/00
(52) U.S. Cl. .................... 370/394; 370/528; 370/332; 370/333; 370/470; 370/230; 370/236; 714/747; 714/776; 714/748
(58) Field of Search ................... 370/394, 332, 370/333, 470, 528, 235, 236; 714/747, 776, 748, 749

(56) References Cited

U.S. PATENT DOCUMENTS

| | | | | |
|---|---|---|---|---|
| 5,526,366 A | * | 6/1996 | Jarvinen et al. | 714/747 |
| 5,596,581 A | * | 1/1997 | Saeijs et al. | 370/394 |
| 5,844,885 A | * | 12/1998 | Grob et al. | 370/216 |
| 6,088,342 A | * | 7/2000 | Cheng et al. | 370/320 |
| 6,335,933 B1 | * | 1/2002 | Mallory | 370/394 |
| 6,389,016 B1 | * | 5/2002 | Sabaa et al. | 370/389 |
| 6,408,003 B1 | * | 6/2002 | Rezaiifar et al. | 370/394 |
| 6,507,582 B1 | * | 1/2003 | Abrol | 370/394 |
| 6,581,176 B1 | * | 6/2003 | Seo | 714/749 |

* cited by examiner

Primary Examiner—Alpus H. Hsu
Assistant Examiner—Clemence Han
(74) Attorney, Agent, or Firm—Lalita W. Pace

(57) ABSTRACT

An apparatus (18) and method (100) provide RLP data checking. The apparatus (10) includes a frame serialization stage (20) and a bad frame filter (22) that detects possible bad frames and reclassifies these bad frames as erasures. In this manner, bad frame data are not passed to the RLP layer (16), and unnecessary resetting and resynchronization steps are avoided.

6 Claims, 2 Drawing Sheets

METHOD AND APPARATUS FOR CHECKING COMMUNICATED DATA

FIELD OF THE INVENTION

The present invention relates generally to communication systems, and more particularly, the present invention relates to a method and apparatus for checking radio link protocol (RLP) data within a communication system.

BACKGROUND OF THE INVENTION

Within a Code Division Multiple Access (CDMA), and other communication system types, communicated information, either voice or data, is carried between communication resources, e.g., a radiotelephone and a base station, on a communication channel. Within broadband, spread spectrum communication systems, such as CDMA based communication systems in accordance with Interim Standard IS-95B, a spreading code is used to define the communication channel.

In addition to a primary channel, the communication channel may also include one or more secondary channels. The secondary channels provide an ability to increase bandwidth by permitting transmission of information within these secondary channels during transmission of data, e.g., coded voice or data, within the primary channel. The primary channel is used to carry, either at a full transmission rate or some sub-rate, data such as coded voice or data. When not carrying data, the primary channel carries an idle data pattern.

The secondary channels may carry virtually any form of data, including what is referred to as RLP data. However, the secondary channels do not always carry data. For example, according to the IS-95B standard for high-speed data services over CDMA cellular systems, a given call may concatenate up to 7 supplemental channels with the fundamental channel to transmit high bandwidth data. The supplemental channels are required by IS-95B to either transmit at full rate or to mute the transmitter. The problem is that when the supplemental channels are muted, the receiver has no way of knowing this and the receiver attempts to decode the air signals as if a full rate frame was sent. Muting the transmitter results in a random data pattern, and it is this random data pattern that the receiver attempts to decode. The frame CRC is intended to screen these decoded random data frames; however, the IS-95B frame CRC is only 12-bits. This means for random data, the frame CRC will pass a frame as valid on average once every 4096 muted frames.

Interim Standard IS-707A specifies the transmission of RLP data, but provides very little error checking of data frames received. When corrupt data frames are received by the RLP layer after falsely passing the frame CRC, the typical result is a reset of the RLP layer. This causes data loss and requests for retransmission by higher layer protocols. When the RLP layer receives the corrupt data frame, it will detect missing data frames from the currently expected sequence number up to the sequence number of the corrupt data frame and will request retransmission of these data frames from the peer RLP layer. Since the frames detected as missing by one RLP layer were never really sent by the peer RLP layer, the peer RLP layer cannot comply with the request. According to the IS-707A standard, the RLP layers need to resynchronize via the RLP reset procedure. In most cases, this will result in data loss to the higher layers, which produces the overall effect of degraded bandwidth. This can also affect triggering of the dormant timer for packet data since the retransmission requests and the RLP reset procedure appear as activity and reset the timer. Timer reset can cause calls that are effectively idle, to remain active and consume resources.

Thus, there is a need for a method and apparatus for providing RLP data checking in a communication system.

DETAILED DESCRIPTION OF THE PREFERRED EMBODIMENTS

An apparatus and method provide RLP data checking. In accordance with preferred embodiments of the invention, an apparatus includes a frame serialization stage and a bad frame filter that detects possible bad frames and reclassifies these bad frames as erasures. In this manner, bad frame data are not passed to the RLP layer, and unnecessary resetting and resynchronization steps are avoided.

Figure 1:
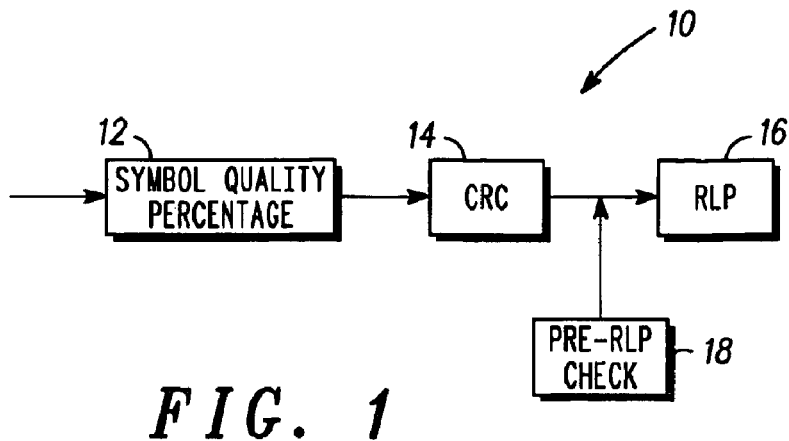
FIG. 1 is a block diagram of a supplemental band processing apparatus incorporating an RLP data checking stage in accordance with a preferred embodiment of the invention.

With reference to FIG. 1, a data processing apparatus 10 includes a symbol quality assessment stage 12, a frame CRC stage 14 and a RLP data layer 16. The symbol quality assessment stage 12 evaluates data frames utilizing a weighting procedure to ensure that no more than a predetermined percent of the bad frames are passed on to the CRC stage 14. To overcome problems associated with passing random frames from the CRC stage 14, it is possible to adjust the threshold of the symbol quality assessment stage 12. However, such an adjustment would necessarily result in rejecting a higher percentage of good frames. Rejecting good frames requires higher layer activity to request retransmission of these frames. Thus, adjusting the symbol quality assessment stage 12 is not a viable solution to the problem of passing bad frames to the RLP layer 16. Therefore, to overcome the problem of passing bad frames to the RLP data layer 16, disposed between the CRC stage 14 and the RLP data layer 16 is a pre-RLP data checking stage 18.

Figure 2:
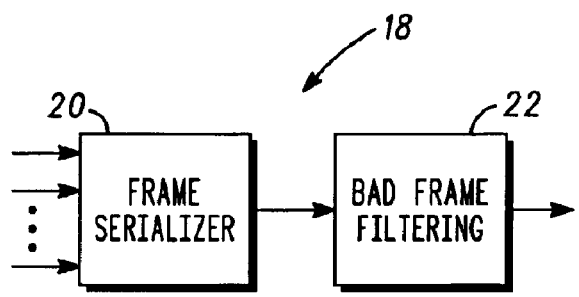
FIG. 2 is a block diagram illustrating an apparatus for providing RLP data checking in accordance with a preferred embodiment of the invention.

FIG. 2 illustrates the pre-RLP data checking stage 18, which, as can be seen from FIG. 2, includes a frame serialization stage 20 and a bad frame filter stage 22. The frame serialization stage 20 receives RLP frames from the IS-95 layer, and serializes them according to the frame sequence number associated with each frame.

Figure 3:
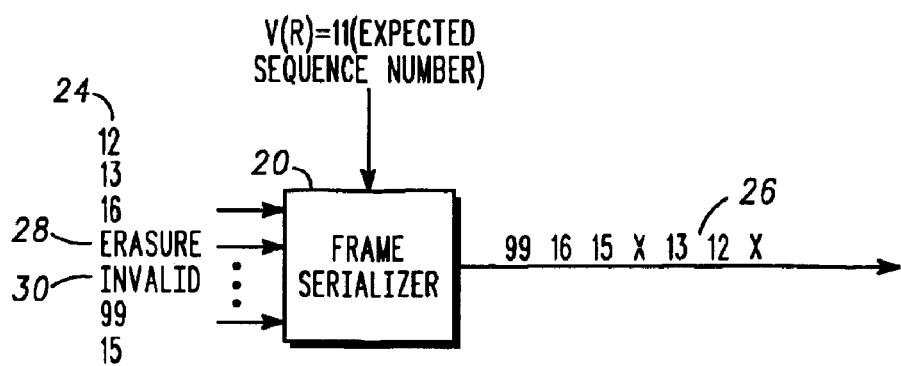
FIG. 3 is a block diagram illustration of the frame serialization function illustrated in the block diagram of FIG. 2.

The process of frame serialization is illustrated in FIG. 3, wherein a plurality of frames having sequence numbers 24 are received by the frame serialization stage 20. The frame serialization stage further receives expected sequence number data, V(R), from the RLP layer. An output of the frame serialization stage 20 is a serialized sequence of frames 26. In the example illustrated in FIG. 3, the expected sequence number, V(R) is 11, the received frames are numbered 12, 13, 15, 16 and 99 along with an erasure frame 28 and an invalid frame 30. The frame serialization stage 20 is operable to insert a place holding frame "X" in place of potentially missing frames. Thus, the serialized frame sequence 26 is shown in FIG. 3 as "x12 13x15 16 99" where "Xs" have been inserted for the apparently missing frames 11 and 14. Once the sequence has been serialized, the sequenced frames may be filtered by the bad frame filter stage 22. In accordance with a preferred embodiment of the invention, the frame bearing sequence number "99" would be reclassified as an erasure because it is substantially out of sequence in comparison with the expected sequence number and the maximum number of frames that could be received within a particular time slot.

Figure 4:
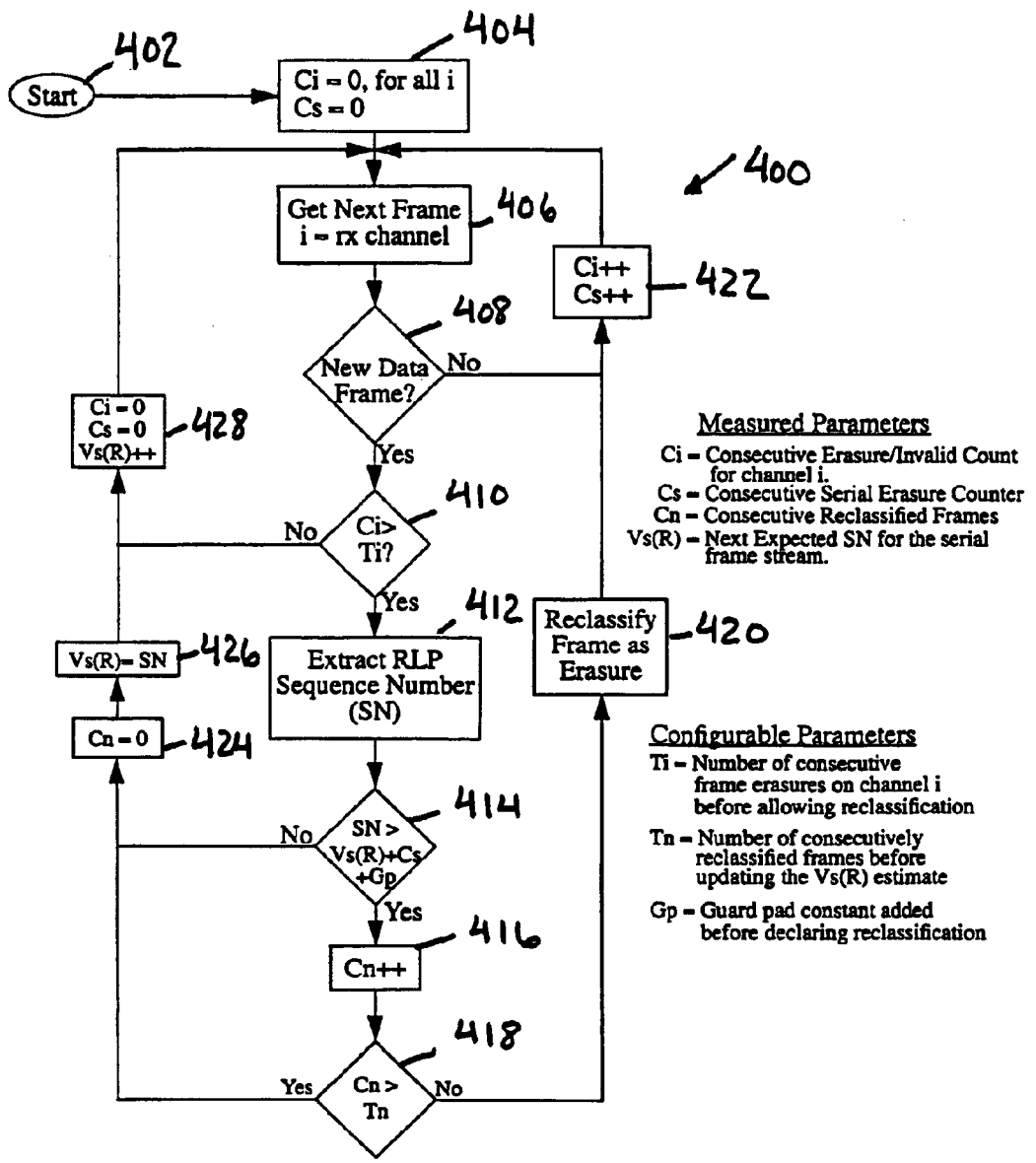
FIG. 4 is a flow chart illustrating a method of RLP data checking in accordance with a preferred embodiment of the invention.

A process 400 for filtering used by the bad frame filter stage 22 is illustrated in the flow chart of FIG. 4. A feature of the bad frame filter stage 22 is the reclassification of suspected bad frame data as erasures. Erasures are recognized by the RLP layer, and do not cause initiation of reset procedures. The process 400 starts at step 402 and a consecutive erasure/invalid counter, Ci, and a consecutive serial erasure counter, Cs, are reset. For each frame received, step 406, the process first determines whether the frame is a new RLP data frame or not, step 408. RLP control frames and retransmitted data frames are not filtered by the process since RLP already protects against errors for these types of frames. For the purposes of this process, these frame types are treated as erasure/invalid frames and the consecutive erasure counters are incremented, step 422.

If the received frame is a new data frame, the consecutive erasure counter for the given channel is compared against a threshold value, step 410, to determine whether the frame is eligible for being discarded. If it is, then the frame sequence number of the received frame is compared with the next expected sequence number $V_s(R)$, step 412, and to the number of consecutive erasures from the serialized frame sequence 32, step 414, to determine whether the frame is valid or not. If the frame is considered to have an invalid sequence number, the consecutive reclassification counter is incremented, step 416, and compared to a threshold, step 418. If the threshold has not been exceeded, the frame is discarded, step 420, and the consecutive erasure counters are updated, step 422. Otherwise the frame is considered valid since it is possible that the frame was received within the elapsed time. In this case, the consecutive reclassification frames counter Cn is reset, step 424, $V_s(R)$ is updated to be one greater than the valid sequence number, steps 426 and 428 and the counters Ci and Cs are reset. It should be noted that $V_s(R)$ is reinitialized to V(R) (from the RLP layer) at the beginning of each 20 millisecond (ms) frame block.

The proposed process has been designed with several configurable parameters to alter its behavior. The consecutive channel erasure threshold ($T_r$) may be used to prevent reclassification when a given channel is transmitting on most of its timeslots. The consecutive reclassification threshold is designed to protect the algorithm in the event that a gap in RLP sequence number does develop without the appropriate amount of elapsed time. The sequence number guard pad allows the algorithm to allow some small deviations in sequencing before declaring the frame invalid and forcing reclassification.

The process described could also be expanded to delay decisions on frame reclassification until the next set of frames has arrived. This would introduce some delay in the process; however, information regarding further sequence numbers may strengthen the algorithm and reduce the probability of bad decisions. For example, if a group of frames appear substantially out of sequence, it may be because one or more data packet(s) has/have been delayed. The next sequence of frames may reveal that an otherwise out of sequence frame, is the correct next frame.

The invention has been described in terms of several preferred embodiments. These preferred embodiments are meant to be illustrative of the invention, and not limiting of its broad scope, which is set forth in the following claims. For example, the invention may find application in systems designed in accordance with the IS-95A single variable rate channel structure or in accordance with the IS-95C channel structure, or in any radio-frequency environment where RLP is utilized. One of ordinary skill in the art will appreciate that the invention will benefit virtually any communication system where discontinuous transmission (DTX) is utilized as such system will be susceptible to passing with some probability random data as valid data. In accordance with the invention, and in such system, suspect omitted are detected and place holder frames inserted and/or suspect bad data frames are detected and reclassified, for example, as erasure frames, before being passed to the data detector.

What is claimed is:

1. A method of providing RLP data checking comprising:
   receiving a plurality of RLP data frames, wherein the plurality of RLP data frames can be transmitted across a plurality of channels;
   identifying from the RLP data frames a suspected bad frame by retrieving a data frame sequence identifier from a received valid data frame and comparing the data frame sequence identifier with a data frame sequence parameter;
   wherein the data frame sequence parameter is a function, at least in part, of a number of channels that the plurality of RLP data frames can be transmitted across
   reclassifying the suspected bad frame to form a reclassified frame, wherein the reclassified frame is an erasure: and
   passing the reclassified frame to a RLP data detector.

2. The method of claim 1 whereby at least one of the channels is a Discontinuous Transmission (DTX) channel.

3. The method of claim 1 wherein occurrence of the step of reclassifying the suspected bad frame is dependent on whether a channel is determined to be currently in active use.

4. The method of claim 1 wherein occurrence of the step of reclassifying the suspected bad frame is dependent on an elapsed time from receiving a previous data frame sequence identifier.

5. A method of providing RLP data checking comprising:
   receiving a plurality of RLP data frames, wherein the plurality of RLP data frames can be transmitted across a plurality of channels;
   identifying from the RLP data frames a suspected bad frame by retrieving a data frame sequence identifier from a received valid data frame and comparing the data frame sequence identifier with a data frame sequence Parameter;
   wherein the data frame sequence parameter is a function, at least in part, of a number of channels determined to be in active use:
   reclassifying the suspected bad frame to form a reclassified frame, wherein the reclassified frame is an erasure; and
   passing the reclassified frame to a RLP data detector.

6. The method of claim 5 whereby a channel is determined to be in active use by:
   maintaining a consecutive erasure count for each of the channels; and
   comparing at least one of the consecutive erasure counts with at least one threshold.

* * * * *